(12) United States Patent
Vendig et al.

(10) Patent No.: US 7,476,832 B2
(45) Date of Patent: Jan. 13, 2009

(54) SEASONALLY ADJUSTABLE MOUNTING SYSTEM FOR SOLAR PANELS HAVING DUAL MOTOR ASSEMBLY

(76) Inventors: Herb Vendig, 1205 Highland Blvd., Hoffman Estates, IL (US) 60105; Shin-Min Song, 1099 Collingwood Dr., Naperville, IL (US) 60540

( * ) Notice: Subject to any disclaimer, the term of this patent is extended or adjusted under 35 U.S.C. 154(b) by 15 days.

(21) Appl. No.: 11/770,444

(22) Filed: Jun. 28, 2007

(65) Prior Publication Data

US 2008/0040990 A1  Feb. 21, 2008

Related U.S. Application Data

(60) Provisional application No. 60/819,814, filed on Jun. 29, 2006.

(51) Int. Cl.
*G01C 21/02* (2006.01)
(52) U.S. Cl. .................. 250/203.4; 250/203.1
(58) Field of Classification Search .............. 250/203.4, 250/203.1, 201.1, 203.6, 239, 216, 221; 126/576–578, 126/694–696; 52/173.3; 136/246–291
See application file for complete search history.

(56) References Cited

U.S. PATENT DOCUMENTS

| 4,055,161 | A | | 10/1977 | Jones |
| 4,883,340 | A | * | 11/1989 | Dominguez .................. 359/593 |
| 7,202,457 | B2 | | 4/2007 | Janus et al. |

* cited by examiner

*Primary Examiner*—Que T Le
(74) *Attorney, Agent, or Firm*—Intellipex PLLC; Jay Schloff

(57) ABSTRACT

A mounting system comprising at least one mounting assembly is disclosed. A mounting assembly is used to mount at least one solar panel. The mounting assembly includes a support base, a rotating base, a first motor assembly, a solar panel base and a second motor assembly. The rotating base is mounted on the support base and rotates about its vertical axis by the help of the first motor assembly, which is disposed between the rotating base and the support base. The solar panel base is coupled to the rotating base through a set of links, which transfers the rotation of the rotating base to the solar panel base. The second motor assembly is disposed on the rotating base and it provides a tilting movement to the solar panel base, which enables solar panel base to tilt at a plurality of angle from the horizontal surface of the rotating base.

24 Claims, 13 Drawing Sheets

SEASONALLY ADJUSTABLE MOUNTING SYSTEM FOR SOLAR PANELS HAVING DUAL MOTOR ASSEMBLY

CROSS REFERENCE TO RELATED APPLICATIONS

The present invention claims priority under 35 United States Code, Section 119 on the provisional application No. 60/819,814 filed on Jun. 29, 2006

FIELD OF THE INVENTION

The present invention generally relates to mounting systems, and more particularly, to the mounting system for the solar panels.

BACKGROUND OF THE INVENTION

In recent time, the use of alternative energy such as solar energy has become very popular. Solar panels, or collectors that collect the solar energy, has been widely used in the fields including, but are not limited to, generating electricity, heating water and air, and for light purposes. These solar panels mainly collect solar energy from a chief solar energy source 'sun'. These panels are usually placed on the roof structure or an open ground to collect solar energy from the sun directly.

Most of the currently used solar panels are mounted in a fixed non-moving position. For example, most of the solar panels are installed at the non-adjustable angles on the south side of a roof slope in the northern hemisphere. These solar panels do not tend to utilize the path of the sun in the sky to collect the optimum amount of solar energy due to their fixed and non-adjustable position.

However, various types of mounting systems for the solar panels are prevalent these days that tend to track the path of the sun in the sky. A typical solar panel on these mounting systems generally moves along more than one axis. These systems are not user customizable and flexible in terms of their installation. Moreover, these systems are not fine tuned with reference to the position of the sun in the sky across all seasons in a calendar year. Further, these systems do not take into account factors such as effect of wind on the solar panels, power saving, operating cost reduction and easy to install anywhere. Nor do these systems generate their electrical power to control the orientation of the solar panels. These systems also do not automatically adjust the orientation of the solar panels to maximize the electricity produced by reflected sunlight when the sun is blocked by cloud, trees or building structures.

Based on the above discussions, there is a need for a mounting system that is suitable for providing a precise tracking with respect to the position of the sun for the solar panel. Further the mounting system should also be capable of maintaining an azimuth of 90 degree with the sun. Moreover, the system should also be capable of providing a reduced power requirement, an easy to install and an option of user customizability.

SUMMARY OF THE INVENTION

In view of the foregoing disadvantages inherent in the prior art, the general purpose of the present invention is to provide mounting system for solar panels, to include all the advantages of the prior art, and to overcome the drawbacks inherent therein.

In one aspect, the present invention provides a mounting system for solar panels. The mounting system comprises at least one mounting assembly. Each mounting assembly is used to mount at least one solar panel. The mounting assembly comprises a support base, a rotating base, a first motor assembly, a solar panel base and a second motor assembly. The rotating base is mounted on the support base and configured to rotate about a vertical axis of the rotating base. The first motor assembly is disposed on the support base and capable of providing a rotational motion to the rotating base. The solar panel base has an upper surface and a lower surface. The solar panel base is pivotally coupled to the rotating base through a set of links at the lower surface. The upper surface of the solar panel base is capable of mounting at least one solar panel. The second motor assembly is disposed on the rotating base. The second motor assembly is configured to enable the solar panel base to tilt at a plurality of angles to a horizontal surface of the rotating base through at least one link of the set of links. The set of links are capable of transferring the rotational motion of the rotating base to the solar panel base. The at least one link of the set of links is capable of tilting the solar panel base at the plurality of angles.

In another aspect, the present invention provides a mounting system for solar panels. The mounting system comprises at least one mounting assembly. Each mounting assembly is used to mount at least one solar panel. Further, each mounting assembly comprises a support base, a rotating base, a first motor assembly, a solar panel base, a second motor assembly and a slider mechanism. The rotating base is mounted on the support base and configured to rotate about a vertical axis of the rotating base. The first motor assembly is disposed on the support base and capable of providing a rotational motion to the rotating base. The solar panel base has an upper surface and a lower surface, the solar panel base pivotally coupled to the rotating base through a set of links at the lower surface and the upper surface is capable of mounting at least one solar panel. The second motor assembly is disposed on the rotating base and configured to enable the solar panel base to tilt at a plurality of angles to a horizontal surface of the rotating base through a movement of at least one link of the set of links. The slider mechanism is disposed on the rotating base. The slider mechanism is coupled to a peripheral edge of the solar panel base and is capable of guiding the peripheral edge of the solar panel base for sliding along a horizontal surface of the rotating base based on the movement of the at least one link. The set of links are capable of transferring the rotational motion of the rotating base to the solar panel base. The at least one link of the set of links is capable of tilting the solar panel base at the plurality of angles.

In yet another aspect, the present invention provides a mounting system for solar panels. The mounting system comprises at least one mounting assembly. Each mounting assembly is used to mount at least one solar panel. The each mounting assembly comprises a support base, a rotating base, a first motor assembly, a solar panel base and a second motor assembly. The rotating base is mounted on the support base and configured to rotate about a vertical axis of the rotating base. The first motor assembly is disposed on the support base and capable of providing a rotational motion to the rotating base. The solar panel base has an upper surface and a lower surface and a set of links attached to the lower surface, where the set of links of the solar panel base are pivotally coupled to the rotating base, the upper surface is capable of mounting at least one solar panel. The second motor assembly is disposed on the rotating base and is operably coupled to the set of link of the solar panel base. The second motor assembly is configured to enable the solar panel base to tilt at a plurality of angles to a horizontal surface of the rotating base through the set of link. The set of link is capable of transferring the rotational motion of the rotating base to the solar panel base. The set of link is further capable of tilting the solar panel base at the plurality of angles.

BRIEF DESCRIPTION OF THE DRAWINGS

The advantages and features of the present invention will become better understood with reference to the following detailed description and claims taken in conjunction with the accompanying drawings, wherein like elements are identified with like symbols, and in which:

Like reference numerals refer to like parts throughout the description of several views of the drawings.

DETAILED DESCRIPTION OF THE INVENTION

Figure 1:
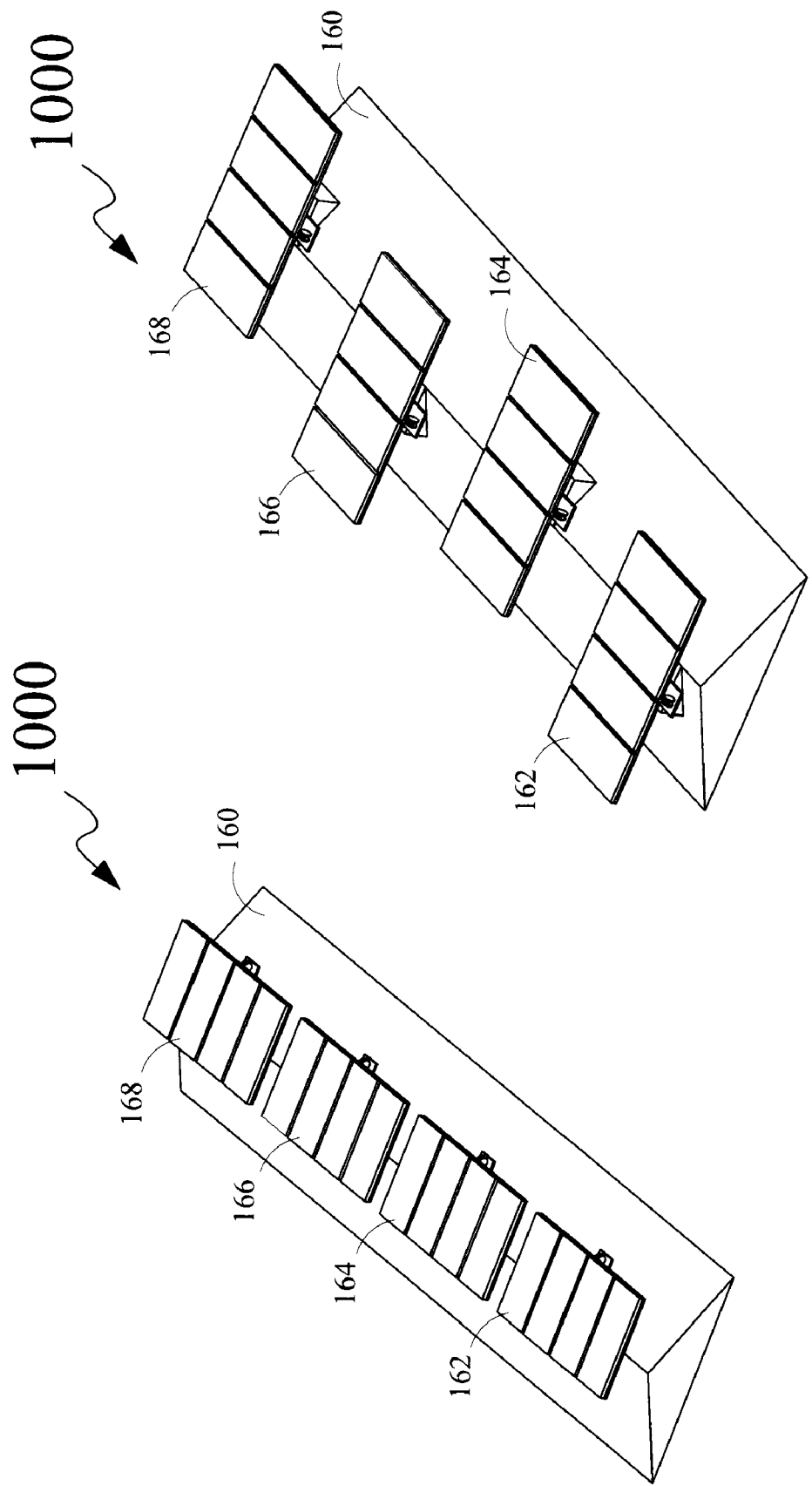
FIG. 1A is a perspective view of a mounting system 1000 having a liner arrangement of mounting assemblies, according to an exemplary embodiment of the present invention.
FIG. 1B is a perspective of the mounting system 1000 having a staggered arrangement of the mounting assemblies, according to an embodiment of the present invention.

For a thorough understanding of the present invention, refer to the following detailed description, including the appended claims, in connection with the above-described drawings. Although the present invention is described in connection with exemplary embodiments, the present invention is not intended to be limited to the specific forms set forth herein. It is understood that various omissions and substitutions of equivalents are contemplated as circumstances may suggest or render expedient, but these are intended to cover the application or implementation without departing from the spirit or scope of the claims of the present invention. Also, it is to be understood that the phraseology and terminology used herein is for the purpose of description and should not be regarded as limiting.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The term 'set' herein represents one item or a group of the similar items. In other words, the cardinality of the set is one or more than one.

The present invention provides a mounting system which is seasonally adjustable and is capable of being installed over a surface of ground, a roof top structure or similar structure. The mounting system comprises at least one mounting assembly and each mounting assembly of the at least one mounting assembly are arranged in a pre-determined fashion. The mounting assembly is capable of mounting at least one solar panel. The mounting assembly of the present invention has substantially reduced configurational complexities for the purpose of tracking the various positions of the sun. The tracking of the sun is performed in such a manner that an azimuth of 90 degrees is maintained between the solar panels and the sun, which increases the efficiency of the solar panels. Further, the mounting system is capable of tracking the various positions of the sun throughout a day and year. The system's adjustability also can compensate for the lack of direct sunlight by aligning itself to receive sunlight reflected from nearby structures and surfaces where direct sunlight on the system is otherwise lacking.

Referring to FIGS. 1A and 1B, schematic diagrams illustrating arrangements of the mounting assemblies in the mounting system 1000 is shown. The mounting system comprises a surface 160, a mounting assembly 162, a mounting assembly 164, a mounting assembly 166 and a mounting assembly 168. The arrangement of the mounting assemblies in the mounting system 100 in FIGS. 1A and 1B is for exemplary purposes only and it should not be considered limiting. It should be apparent to a person skilled in the art that the number of mounting assemblies in the mounting system 100 can also be other than four. The structure 160 can be a roof structure or similar structures. The roof structure can be a flat roof structure or an inclined roof structure. The similar structures can be an open ground or any cemented structure made on the ground.

FIG. 1A represents a mounting system 1000, where the mounting assemblies 162, 164, 166 and 168 are arranged in a linear fashion. These mounting assemblies 162, 164, 166 and 168 can be arranged in a linear fashion in the inclined or the flat roof structure. As shown in FIG. 1A, each of the mounting assemblies 162, 164, 166 and 168 include can include a plurality of solar panels. FIG. 1B represents a mounting system 1000, where the mounting assemblies 162, 164, 166 and 168 are arranged in a staggered fashion. As shown in FIG. 1B, the staggered fashion includes arranging the mounting assemblies 162 and 164 on the one inclined surface of the structure 160 and the mounting assemblies 166 and 168 on another opposite inclined surface of the structure 160.

Figure 2:
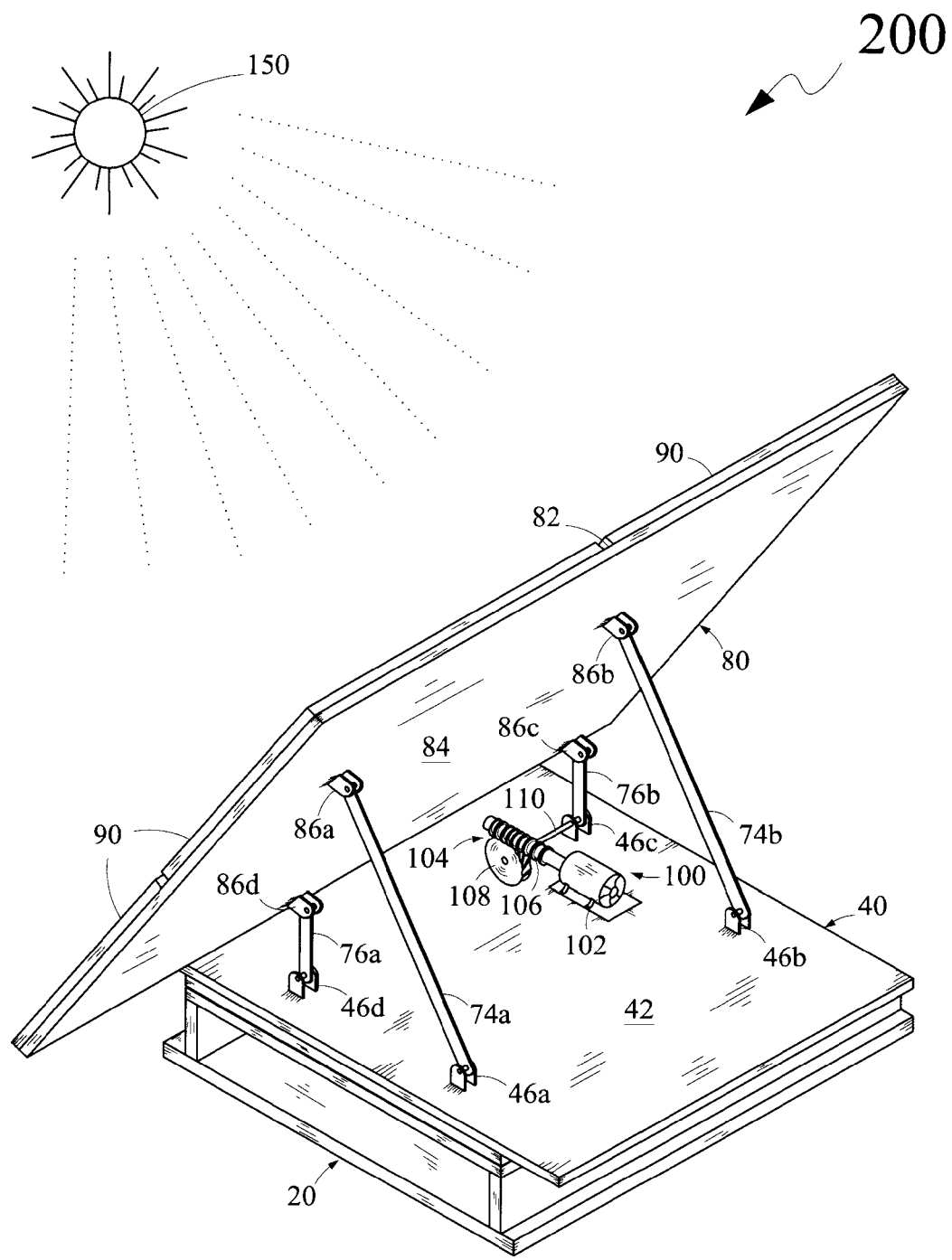
FIG. 2 is a perspective view of a mounting assembly 200, according to an embodiment of the present invention.
Figure 3:
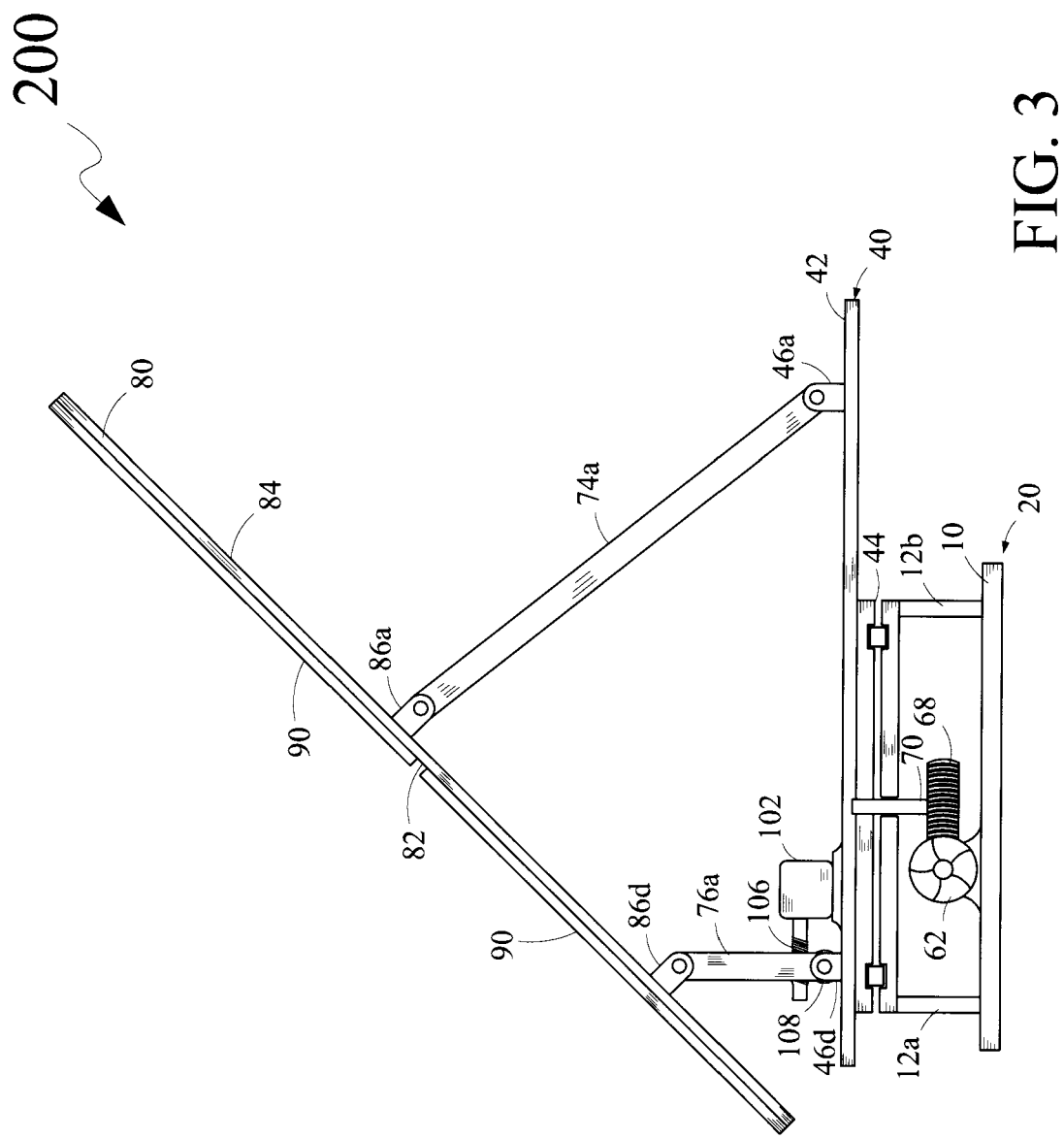
FIG. 3 is a side view of the mounting assembly 200, according to an embodiment of the present invention.
Figure 4:
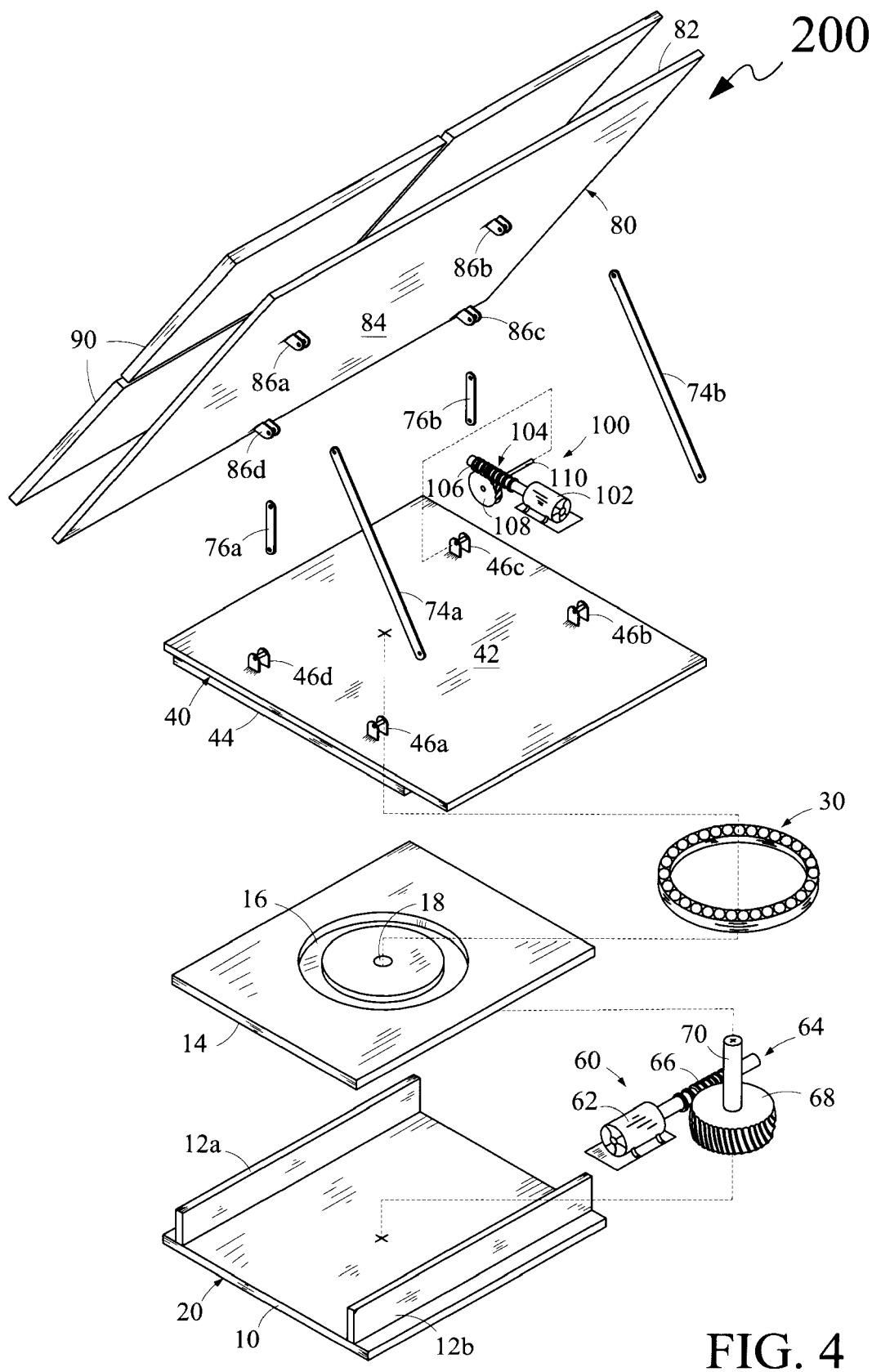
FIG. 4 is a exploded view of the mounting assembly 200, according to an embodiment of the present invention.

Referring to FIG. 2-4, in one embodiment, a mounting assembly 200 incorporating a four bar mechanism, is shown. The mounting assembly 200 can be any one of the mounting assemblies 162, 164, 166 and 168. The mounting assembly 200 comprises a support base 20, a rotating base 40, a first motor assembly 60, solar panel base 80, a second motor assembly 100 and a set of links 74a, 74b, 76a, 76b. The mounting assembly 200 is capable of mounting at least one solar panel 90 (hereinafter referred to as 'solar panels 90') and orient the solar panels 90 such that an azimuth of 90 degrees is maintained between the solar panels 90 and the sun 150.

The support base 20 comprises a lower supporting wall 10, a set of vertically oriented walls having a first vertical wall 12a and a second vertical wall 12b, and an upper supporting wall 14. The support base 20 is capable of being disposed on the roof structure or the ground. However, it will be apparent to a person skilled in the art that support base 20 can be placed at any fixed or moving surface which is similar the roof structure. More specifically, the lower supporting wall 10 is positioned parallel to the ground. The first vertical wall 12a and the second vertical wall 12b are vertically oriented walls placed on the lower supporting wall 10. The upper supporting wall 14 is placed on top of the verticals walls 12a and 12b.

The support base 20 further comprises a roller bearing 30 disposed on an upper surface of the upper supporting wall 14. More specifically, the upper supporting wall 14 comprises a circular groove 16 disposed on the upper surface of the upper supporting wall 14. The circular groove 16 is configured such that it partially accommodates the roller bearing 30. Further, the upper supporting wall 14 comprises a hole 18 passing through the centre of the upper supporting wall 14. The hole 18 enables in coupling the rotating base 40 and the first motor assembly 60.

In one embodiment of the present invention, the rotating base 40 is a stepped rectangular plank like structure having an upper surface 42 and a lower surface 44. However, it will be apparent to a person skilled in the art that the rotating base 40 can also be of a circular or a polygonal shape. The lower surface 44 is operably coupled to the upper supporting wall 14 through the roller bearing 30. More specifically, the lower surface 44 of the rotating base 40 comprise a circular groove (not shown) similar to the circular groove 16, formed in the upper surface of the upper supporting wall 14 and capable of partially accommodating the roller bearing 30. The roller bearing 30 is accommodated completely between circular grooves of the rotating base 40 and the upper supporting wall 14. The purpose of the roller bearing 30 is to substantially avoid the friction between rotating base 40 and the upper supporting wall 14. The rotating base 40 comprises a first set of connectors 46a, 46b, 46c, 46d coupled to the upper surface 42.

The first motor assembly 60 is operationally coupled to the rotating base 40 and provides a rotational movement to the rotating base 40 about a vertical axis passing through the hole 18. In one embodiment of the present invention, the first motor assembly 60 is disposed on the lower supporting wall 10 of the support base 20. The first motor assembly 60 comprises a first motor 62 and a fist worm gear assembly 64 operably coupled to the first motor 62. The first motor 62 provides a rotational motion to the rotating base 40. More specifically, the rotational movement imparted to the rotating base 40 by the first motor 62 is communicated through the first worm gear assembly 64.

The first worm gear assembly 64 comprises a first worm gear 66 and a first worm wheel 68 and a first worm shaft 70. The first worm gear 66 has a spirally threaded part. The first worm gear 66 is coupled to a spindle (not shown) of the first motor 62. The first worm wheel 68 is operably coupled to the lower surface 44 of the rotating base 40 through the first worm shaft 70. Upon running the first motor 62 the rotational motion of the spindle of the first motor 62 is transferred to the first worm gear 66. The spirally threaded part of the first worm gear 66 meshes with teeth of the first worm wheel 68 such that the rotation of the first worm gear 66 is further transferred to the first worm wheel 68. The motion of the first worm wheel 68 is transferred to the first worm shaft 70 and thereby rotating the rotating base 40 coupled to the first worm shaft 70. More specifically, the first worm shaft 70 passing through the hole 18 and the first worm gear assembly 64 coupled to the first motor 62 are responsible for changing the rotational motion of the first motor 62 to the rotational movement of the rotating base 40.

The rotational movement of the rotating base 40 is transferred to the solar panel base 80 through the set of links 74a, 74b, 76a and 76b. The links 74a and 74b are longer than the links 76a and 76b.

In one embodiment of the present invention, the solar panel base 80 is a flat rectangular plank like structure having an upper surface 82 and a lower surface 84. However, it will be apparent to a person skilled in the art that the rotating base 80 can also be of a circular or a polygonal shape. The solar panel base 80 is mounted in an inclined manner over the rotating base 40 using the set of links 74a, 74b, 76a and 76b. The solar panel base 80 comprises a second set of connectors 86a, 86b, 86c, 86d coupled to the lower surface 84 of the solar panel base 80. The lower surface 84 of the solar panel base 80 is coupled to the upper surface 42 of the rotating base 40 through the set of links 74a, 74b, 76a and 76b. For example, the opposite ends of the link 74a are pivotally coupled to the connector 46a and the connector 86a. Similarly, the opposite ends of the link 74b, 76a and 76b are pivotally coupled between the connectors 48b, 48c, 48d and the connectors 86b, 86c and 86d. The upper surface 82 is capable of mounting the solar panels 90.

The second motor assembly 100 is operationally coupled to the solar panel base 80 and provides a tilting movement to the solar panel base 80 about a horizontal axis passing through the connectors 46c and 46d. In one embodiment of the present invention, the second motor assembly 100 is disposed on the upper surface 42 of the rotating base 40. As shown in FIG. 2, the second motor assembly 100 is connected to the connector 46c. The second motor assembly 100 comprises a second motor 102 and a second worm gear assembly 104. The second worm gear assembly 104 is operably coupled to the second motor 102. More specifically, the tilting movement imparted to the solar panel base 80 by the second motor 102 is communicated through the second worm gear assembly 104.

The second worm gear assembly 104 comprises a second worm gear 106, a second worm wheel 108 and a second worm shaft 110. The second worm gear 106 has a spirally threaded part. The second worm gear 106 is coupled to a spindle (not shown) of the second motor 102. The second worm wheel 108 is operably coupled to the link 76b through the second worm shaft 110. Upon running the second motor 102 the rotational motion of the spindle of the second motor 102 is transferred to the second worm gear 106. The spirally threaded part of the second worm gear 106 meshes with teeth of the second worm wheel 108 such that the rotation of the second worm gear 106 is further transferred to the second worm wheel 108. The motion of the second worm wheel 108 is transferred to the second worm shaft 110 and thereby tilting the solar panel base 80, which is coupled to the link 76b through the second worm shaft 110. More specifically, the second worm shaft 110 passing through the connector 46c and the link 76b are responsible for imparting the rotational motion of the second motor 102 to the tilting movement of the solar panel base 80.

The first motor 62 and the second motor 102 are powered by a power source (not shown). The power source may include but is not limited to a battery, a generator, or a direct power supply through the power lines. Further, the power from the power source is directed to the first motor 62 and the second motor 102 through a control circuit (not shown). The control circuit may include but is not limited to clock control or a computer directed program.

The control circuit directs power to the first motor 62 and the second motor 102 in such a manner that the solar panel base 80 tilted by the second motor 102 and the rotating base 40 rotated by the first motor 62 are positioned to track the various positions of the sun. Further, the solar panels 90 mounted on the solar panel base 80 maintain an azimuth of 90 degrees with the sun 150. In other words, the first motor 62 and the second motor 102 function mutually for simultaneously imparting movement to the solar panel base 80 for tracking the various positions of the sun 150 and maintaining the azimuth of 90 degrees between the sun 150 and the solar panels 90.

The mounting assembly 200 also comprises a sensor (not shown). The sensor is adapted to generate a signal corresponding to speed of the wind and absence of the sun rays. This signal is used to move the solar panel base in a predetermined position. For example, when the speed of the wind is greater than 40 miles/hour, a corresponding signal can be generated, which is used to move the solar panel base 80 in a the pre-determined position to avoid the impact of the wind. The pre-determined position can be any angular position of the solar panel base 80 depending on installation of the mounting assembly 200. For example, the pre-determined position can be a flat position, which allows the solar panel base to rest in a position parallel to the roof structure or the ground. Similarly, a signal representative of the absence of the sun can also be generated to move the solar panel base 80 flat position. For example, in the night time, the movement of the solar panel base 80 can be rested in a flat position.

Figure 5:
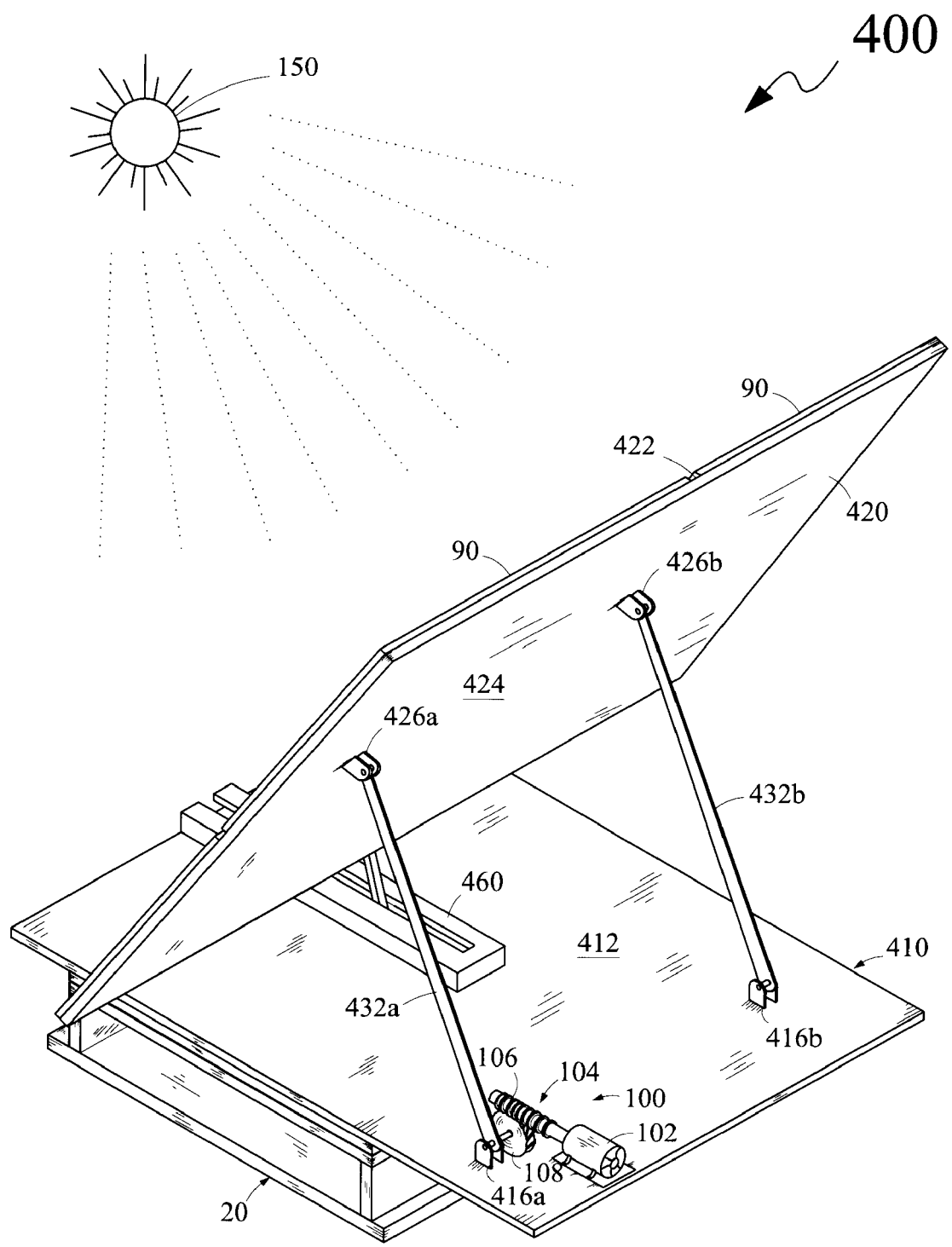
FIG. 5 is a perspective view of a mounting assembly 400, according to an embodiment of the present invention.
Figure 6:
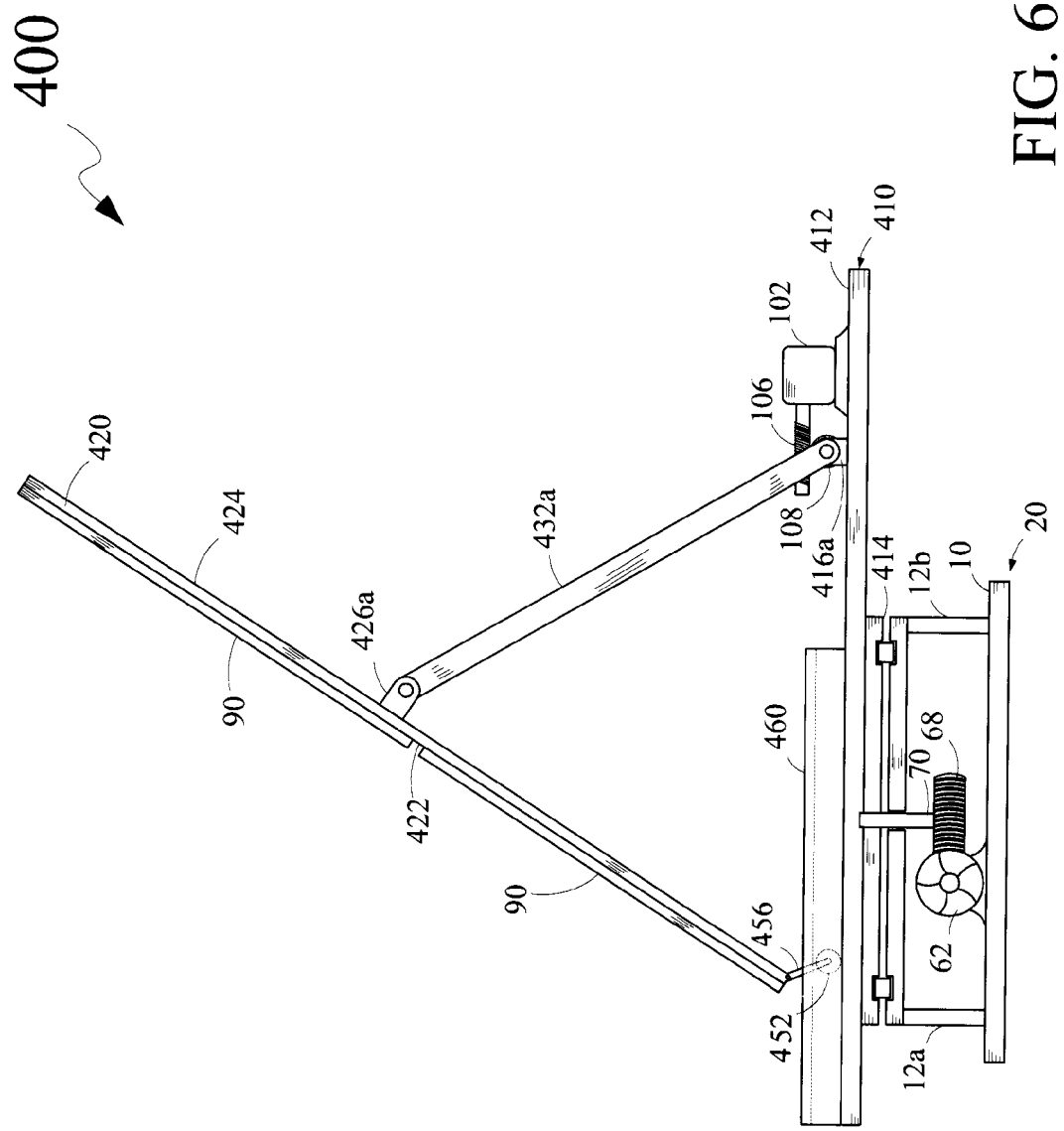
FIG. 6 is a side view of the mounting assembly 400, according to an embodiment of the present invention.
Figure 7:
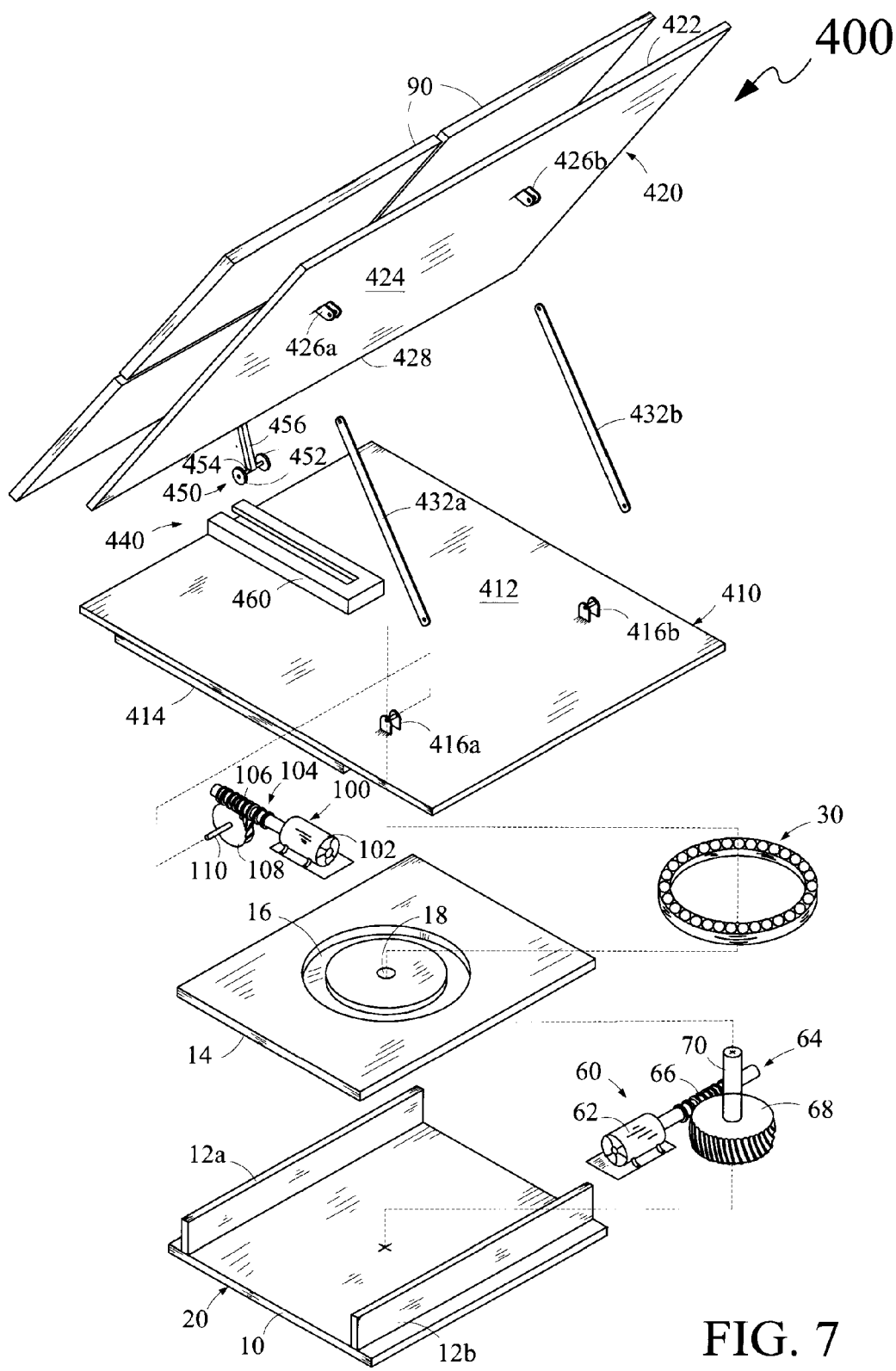
FIG. 7 is a exploded view of the mounting assembly 400, according to an embodiment of the present invention.

Referring to FIG. 5-7, in another embodiment, a mounting assembly 400 incorporating a sliding arrangement is shown. The mounting assembly 400 can be any one of the mounting assemblies 162, 164, 166 and 168. The mounting assembly 400 comprises a support base 20, a rotating base 410, a first motor assembly 60, a solar panel base 420, a second motor assembly 100, a set of links 432a, 432b and a sliding mechanism 440. The mounting assembly 400 is capable of mounting at least one solar panel 90 (hereinafter referred to as 'solar panels 90') and orient the solar panels 90, such that, an azimuth of 90 degrees is maintained between the solar panels 90 and the sun 150.

The support base 20 is already discussed in conjunction with FIGS. 1-3. It should be noted that the description of the support base 20 incorporating the sliding mechanism in another embodiment is same as in 'four bar mechanism.'

In one embodiment of the present invention, the rotating base 410 is a stepped rectangular plank like structure having an upper surface 412 and a lower surface 414. However, it will be apparent to a person skilled in the art that the rotating base 410 can also be of a circular or a polygonal shape. The lower surface 414 of the rotating base 410 is operably coupled to support base 20. The rotating base 410 comprises a first set of connectors 416a, 416b coupled to the upper surface 412. Further, the rotating base 410 is capable of rotating with the help of the first motor assembly 60.

The first motor assembly 60 is operationally coupled to the rotating base 410 and provides a rotational movement to the rotating base 410 about a vertical axis passing through the rotating base 410. Herein, the arrangement and the functioning of the first motor assembly 60 are same as described previously in conjunction with FIGS. 1-3.

In one embodiment of the present invention, the solar panel base 420 is a flat rectangular plank like structure having an upper surface 422 and a lower surface 424. However, it will be apparent to a person skilled in the art that the solar panel base 420 can also be of a circular or a polygonal shape. The solar panel base 420 is mounted in an inclined manner over the rotating base 410 using the set of links 432a and 432b. The solar panel base 420 further comprises a second set of connectors 426a, 426b coupled to the lower surface 424 of the solar panel base 420. The upper surface 424 of the solar panel base 420 is capable of mounting the solar panels 90.

The lower surface 424 of the solar panel base 420 is coupled to the upper surface 412 of the rotating base 410 through the set of links 432a and 432b. The rotational movement of the rotating base 410 is transferred to the solar panel base 420 through the set of links 432a and 432b. The set of links 432a and 432b are pivotally coupled to the connectors 416a and 416b, coupled to the upper surface 412 of the rotating base 410 and to the connectors 426a and 426b, coupled to the lower surface 424 of the solar panel base 420. For example, the opposite ends of the link 432a are pivotally coupled to the connector 416a and the connector 426a. Similarly, the opposite ends of the 432b are pivotally coupled to the connectors 416b and 426b. The solar panel base 420 is capable of tilting at a plurality of angles with the help of second motor assembly 100.

The second motor assembly 100 is disposed on the rotating base 410. Herein the configuration and the functioning of the second motor assembly 100 are same as described in conjunction with FIGS. 1-3. The second motor assembly 100 is connected to the connector 416a of the rotating base 410. The second motor assembly 100 is coupled to the solar panel base 420 through the link 432a. The second motor assembly 100 provides a tilting movement to the solar panel base 420 about a horizontal axis passing through the connectors 416a and 416b. The tilting movement of the solar panel base 420 is guided by the slider mechanism 440.

The slider mechanism 440 comprises a slider 450 and a slider way 460. The slider 450 is coupled to a peripheral edge 428 of the solar panel base 420. The slider way 460 is disposed on the upper surface 412 of the rotating base 410. The slider mechanism 440 is capable of guiding the peripheral edge 428 of the solar panel base 420 to slide along the slider way 460.

The slider 450 comprises a pair of wheels 452, a first connecting rod 454 and a second connecting rod 456. The pair of wheels 452 is pivotally coupled by the first connecting rod 454 by the centers of the pair of wheels 452. The second connecting rod 456 is coupled to a middle portion of the first connecting rod 454 and the peripheral edge 428 of the solar panel base 420. Upon running the second motor 102 of the second motor assembly 100 the link 432a is tilted to an angle, thereby sliding the solar panel base 420 coupled to the slider 450. More specifically, the tilting movement to the link 432a applies a force on the slider 450 such that the peripheral edge 428 slides along the slider way 460.

Figure 8:
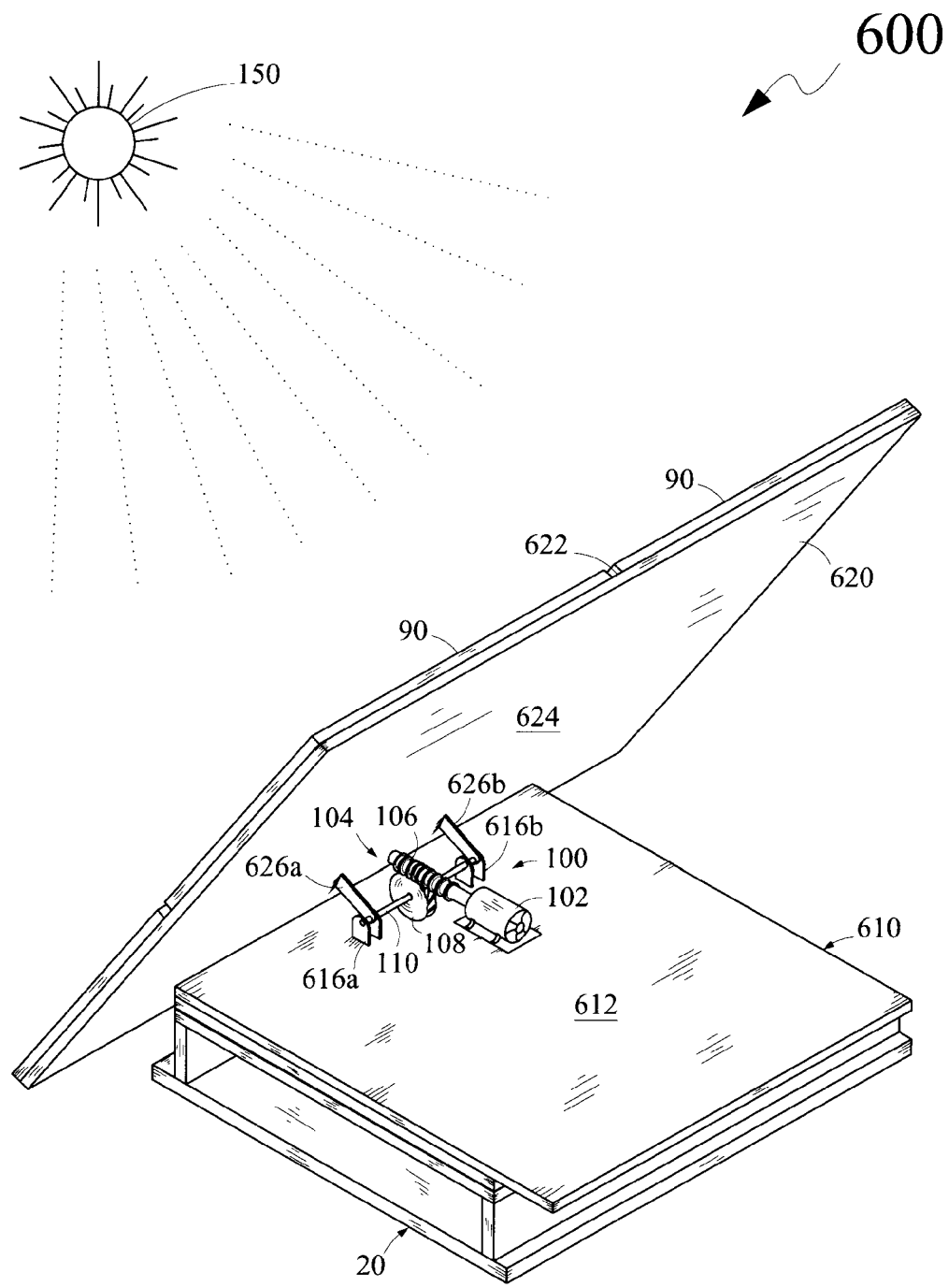
FIG. 8 is a perspective view of a mounting assembly 600, according to an embodiment of the present invention.
Figure 9:
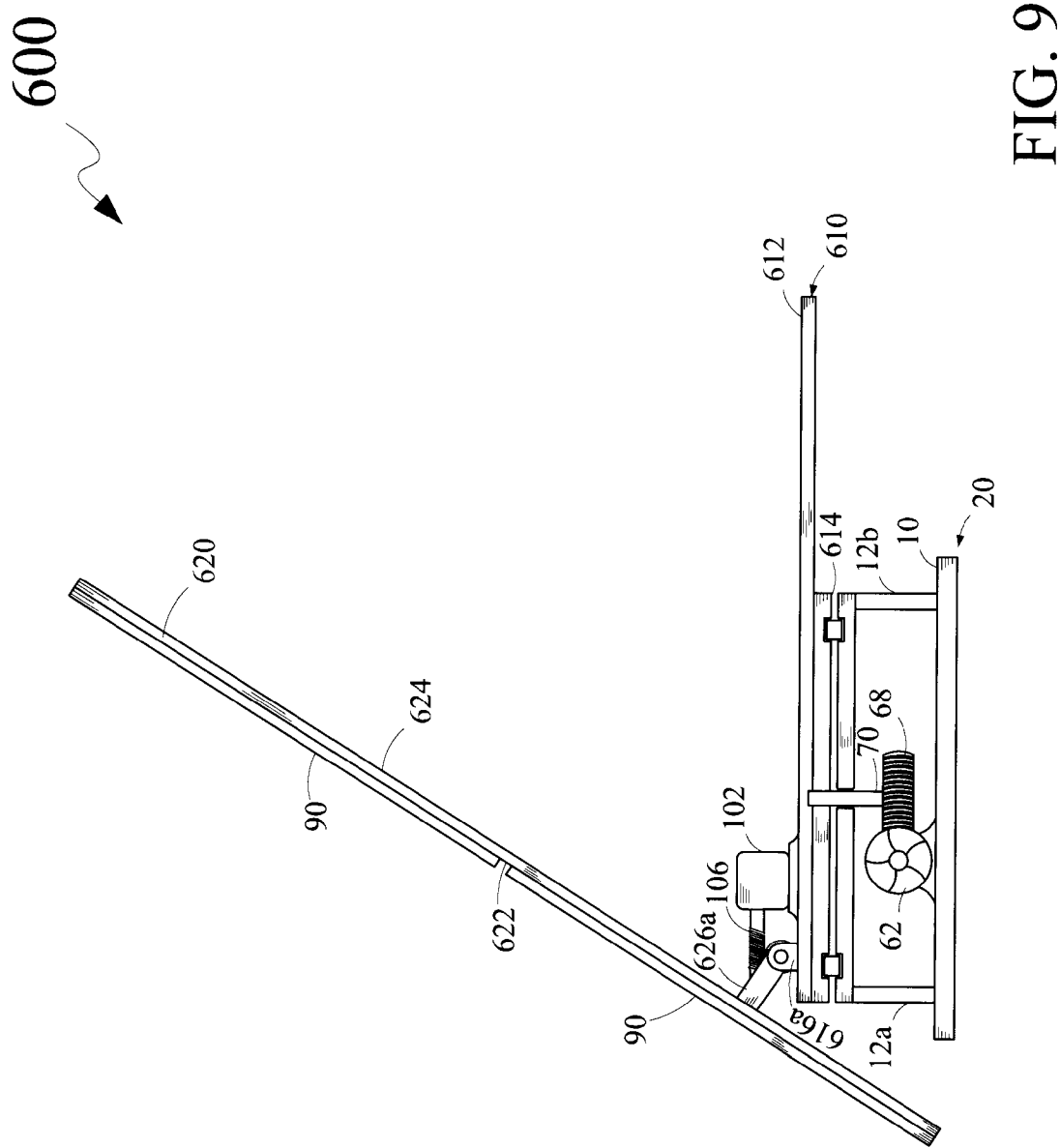
FIG. 9 is a side view of the mounting assembly 600, according to an embodiment of the present invention.
Figure 10:
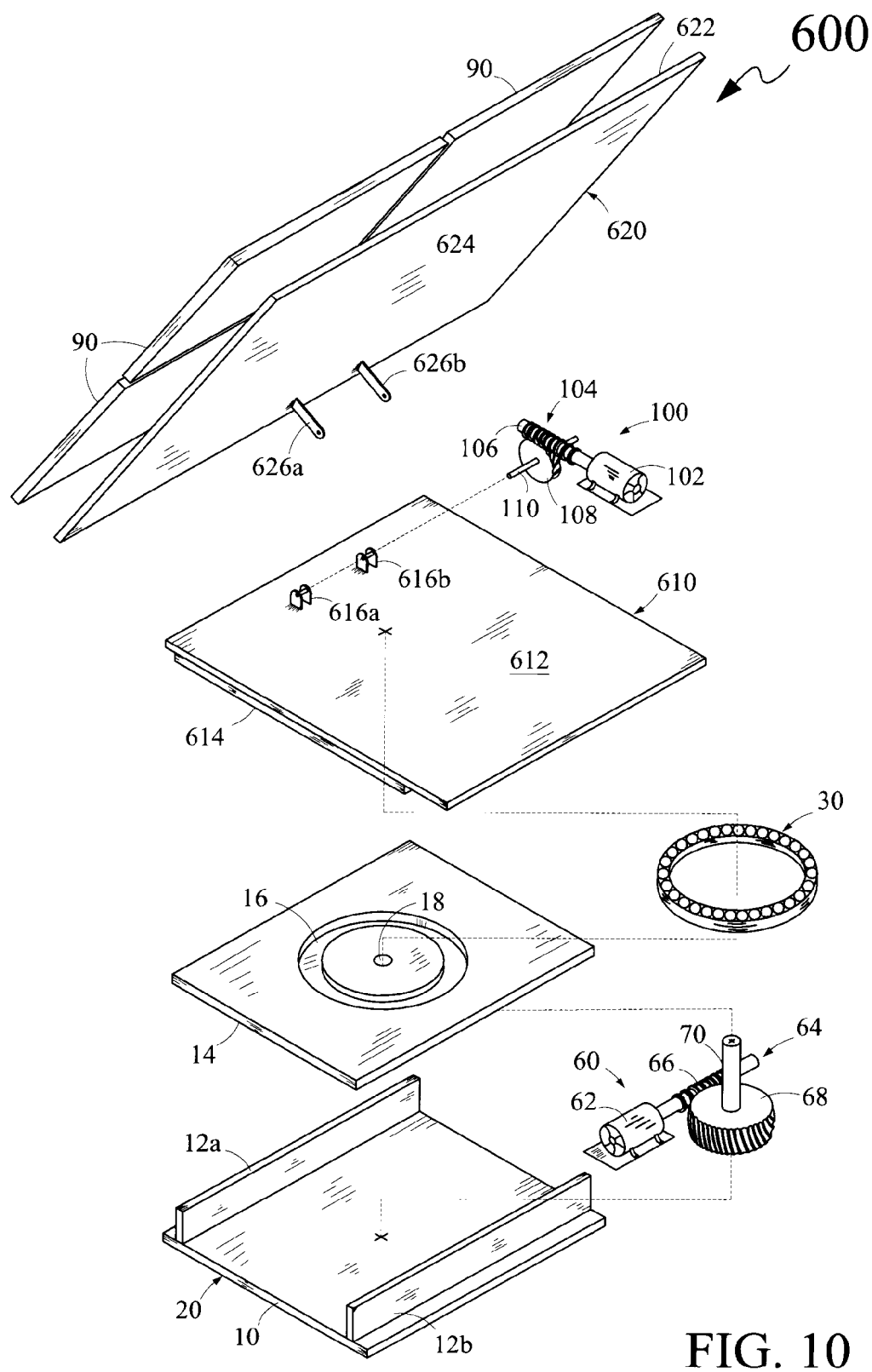
FIG. 10 is a exploded view of the mounting assembly 600, according to an embodiment of the present invention.

Referring to FIG. 8-10, in another embodiment, a mounting assembly 600 incorporating a revolute joint is shown. The mounting assembly 600 can be any one of the mounting assemblies 162, 164, 166 and 168. The mounting assembly 600 comprises a support base 20, a rotating base 610, a first motor assembly 60, a solar panel base 620, a second motor assembly 100 and a set of links 626a, 626b. The mounting assembly 600 is capable of mounting at least one solar panel 90 (hereinafter referred to as 'solar panels 90') and orient the solar panels 90, such that, an azimuth of 90 degrees is maintained between the solar panels 90 and the sun 150.

The support base 20 is already discussed in conjunction with FIGS. 1-3. It should be noted that the description of the support base 20 incorporating the sliding mechanism in another embodiment is same as in 'four bar mechanism'.

In one embodiment of the present invention, the rotating base 610 is a stepped rectangular plank like structure having an upper surface 612 and a lower surface 614. However, it will be apparent to a person skilled in the art that the rotating base 610 can also be of a circular or a polygonal shape. The lower surface 614 of the rotating base 610 is operably coupled to support base 20. The rotating base 610 further comprises a set of connectors 616a, 616b coupled to the upper surface 612. Further, the rotating base 610 is capable of rotating with the help of the first motor assembly 60.

The first motor assembly 60 is operationally coupled to the rotating base 610 and provides a rotational movement to the rotating base 610 about a vertical axis passing through the rotating base 610. Herein, the arrangement and the functioning of the first motor assembly 60 are same as described previously in conjunction with FIGS. 1-3.

In one embodiment of the present invention, the solar panel base 620 is a flat rectangular plank like structure having an upper surface 622, a lower surface 624 and the set of links 626a, 626b. However, it will be apparent to a person skilled in the art that the solar panel base 620 can also be of a circular or a polygonal shape. The upper surface 622 of the solar panel base 620 is capable of mounting the plurality of solar panels 90. The lower surface 664 is operably coupled to the upper surface 612 of the rotating base 620 through the links 626a, 626b.

The links 626a, 626b are coupled to the connectors 616a, 616b disposed on the upper surface 612 of the rotating base 610. Further, the links 626a, 626b are operably coupled to the second motor assembly 100. In one embodiment of the present invention, the second motor assembly 100 is disposed on the rotating base 610. Herein, the configuration and the functioning of the second motor assembly 100 are same as described in conjunction with FIGS. 1-3. The links 626a, 626b enable in transferring the rotational movement of the rotating base 610 to the solar panel base 620. Further, the second motor assembly 100 provides a tilting movement to the solar panel base 620 about a horizontal axis of passing through the connectors 616a, 616b. The links 626a, 626b also transfers the rotational movement of the second motor 102 into the tilting movement of the solar panel base 620.

The mounting assemblies 200, 400 and 600 of the present invention operate on the basis of a path followed by the sun. The path of the sun may be referred as the various positions of the sun in the sky with respect to the earth. The various positions of the sun are determined with the help of an azimuth and an altitude of the sun with respect to the ground. The azimuth may refer as a horizontal angle in degrees of the sun measured clockwise from north and the altitude may be defined as a vertical angle in degrees of the sun measured from the horizontal plane created by the base of the structure upon which the mounting assembly is installed.

The positions of the sun, the azimuth and the altitude, differ from seasons to season. In summers the path of the sun becomes longer and the time between sunrise and sunset increases. At the summer solstice (June 21 in the northern hemisphere) the sun is farthest north and the length of time between sunrise and sunset is the longest of the year. In winters the path of the sun becomes shorter and the time between sunrise and sunset decrease. At the winter solstice (December 22 in the northern hemisphere) the sun is farthest south and the length of time between sunrise and sunset is the shortest of the year. And in the southern hemisphere, winter and summer solstices are exchanged. At the spring equinox (March 20 in the northern hemisphere) and the autumn equinox (September 22 in the northern hemisphere) the night and day are about the same length, upon sun is crossing the equator and it is an equal distance from the North Pole and the South Pole. Similarly, in the southern hemisphere spring equinox and autumn equinox are exchanged.

The working of the mounting assemblies 200, 400 and 600 can be explained with the help of the following non-limiting example. For example, any mounting assembly (hereinafter referred to as 'mounting assembly') of the mounting assemblies 200, 400 and 600 of the present invention is installed in Washington D.C. The sun will have different positions over the Washington D.C based on the time of sunrise and sunset and further with respect to the azimuth and the altitude. To track the various positions of the sun throughout the day with the mounting assembly, the positions of the solar panel base and the rotating base of the mounting assembly change correspondingly such that the azimuth of about 90 degrees is maintained between the sun and the solar panels base at all times the panels are exposed to the sun.

Figure 11A:
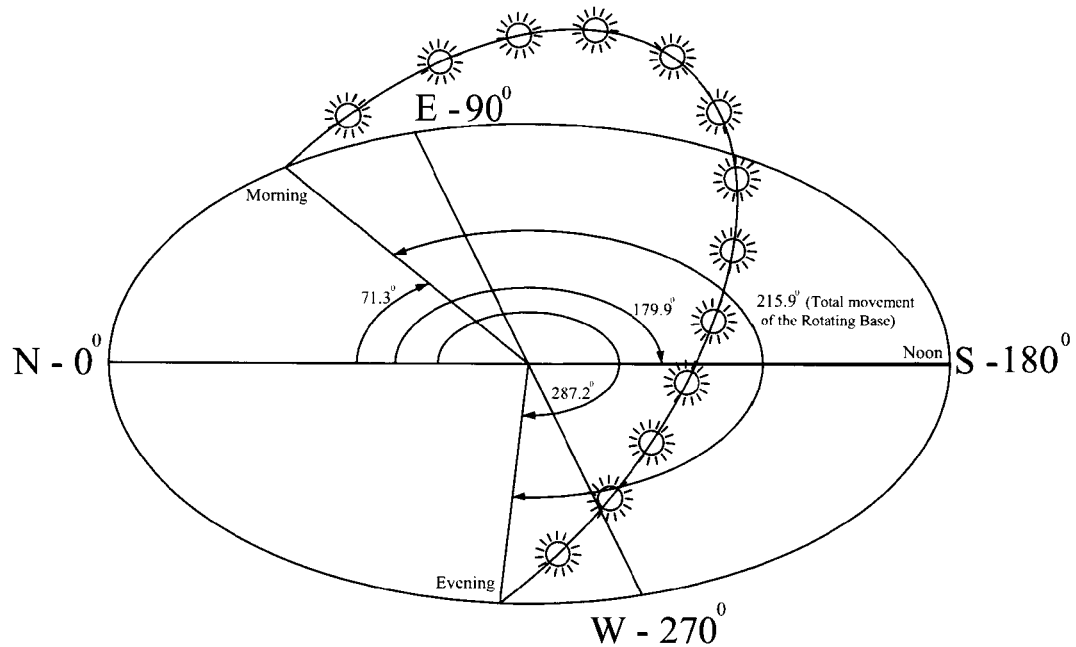
FIGS. 11A and 11B illustrate angular movement of the mounting assembly with respect to summer solstice in Washington D.C.
Figure 11B:
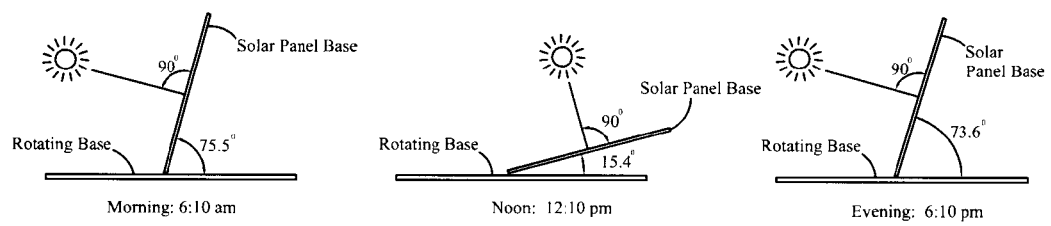

Referring to FIG. 11A and FIG. 11B, illustrated is the angular movement of the mounting assembly with respect to summer solstice in Washington D.C.

Referring to FIG. 11A, illustrated is the angular movement of the rotating base (not shown), upon positioning the rotating base parallel to the surface of the ground. In this figure at about 6:10 am in the morning, the rotating base is positioned at an angle of 71.3 degrees from the North. In the above mentioned condition, a line defining the angle of the rotating base is at 0 degrees once the line is positioned towards the North. Further, in the above mentioned condition the solar panel base is inclined at an angle 75.5 degrees to the rotating base, see FIG. 11B. The above mentioned positions of the rotating base (71.3 degrees from the North) and the solar panel base (inclined at an angle 75.5 degrees) enables the mounting assembly to maintain the azimuth of about 90 degrees between the sun and solar panels, facing the sun in the morning. This position of the rotating base and the solar panel base may be referred as the starting point of an operational cycle, followed by the mounting assembly in an entire day of summer solstice. The time of the operational cycle may be referred as the hours of daylight in the entire day of summer solstice. The movement of the each base of assembly may be automated or may be manually directed by the user. In either instance, the movement may occur in increments as small as one-tenth of a degree so as to maintain the desired orientation of the assembly with respect to the various positions of the sun throughout the day.

At about 12:10 pm, the rotating base will have gradually rotated to achieve an angle of 179.9 degrees from the earlier angle of 71.3 degrees, as shown in FIG. 11B. The solar panel base will have tilted gradually downward to an angle of 15.4 degrees from the earlier angle of 75.5 degrees as shown in FIG. 11B. This position of the rotating base and the solar panel base may be referred as the mid point of the operational cycle for the day of summer solstice. Similarly, the above mentioned positions due to the synchronous movements of the rotating base (179.9 degrees from the North) and the solar panel base (tilting downward to the angle of 15.4 degrees) enables the mounting assembly to maintain the azimuth of about 90 degrees between the sun and the solar panels, facing the sun in the noon of summer solstice.

Further, in the evening at about 6:10 pm the rotating base will have gradually rotated to achieve an angle of 287.2 degrees from the earlier angle of 179.9 degrees, as shown in FIG. 11B. The solar panel base will have tilted upward to an angle of 73.6 degrees from the earlier angle of 15.4 degrees, as shown in FIG. 11B. This position of the rotating base and the solar panel base may be referred as the end point of the operational cycle for the day of summer solstice. Similarly, the above mentioned positions due to the synchronous movements of the rotating base (287.2 degrees from the North) and the solar panel base (tilting upward to the angle of 73.6 degrees) enables the mounting assembly to maintain the azimuth of about 90 degrees between the sun and solar panels, facing the sun in the evening of summer solstice.

Figure 12A:
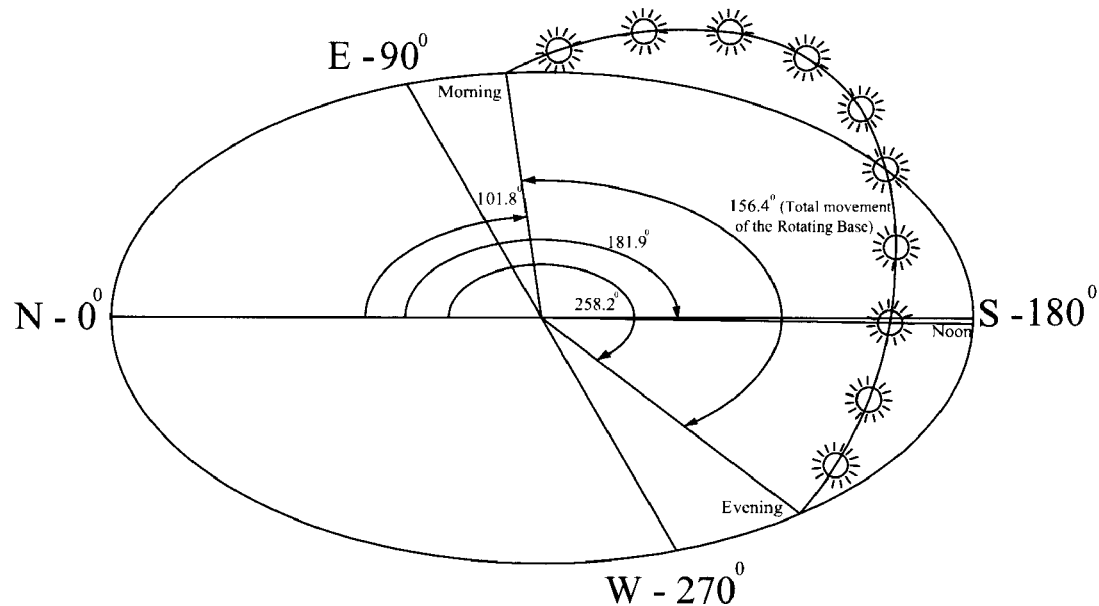
FIGS. 12A and 12B illustrate the angular movement of the mounting assembly with respect to fall equinox in Washington D.C.
Figure 12B:
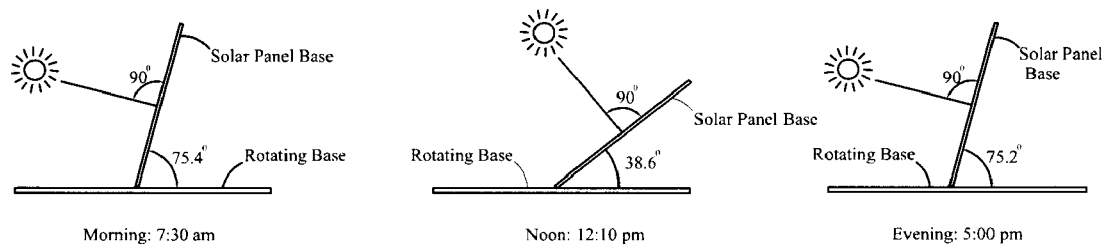

Referring to FIG. 12A and FIG. 12B, illustrated is the angular movement of the mounting assembly with respect to fall equinox in Washington D.C.

Referring to FIG. 12A, illustrated is the angular movement of the rotating base (not shown), in the fall equinox. In this figure at about 7:30 a.m., the rotating base is positioned at an angle of 101.8 degrees from the North. The solar panel base is inclined at an angle 75.4 degrees to the rotating base, as shown in FIG. 12B. The above mentioned positions of the rotating base (101.8 degrees from the North) and the solar panel base (inclined at an angle 75.4 degrees) enable the mounting assembly to maintain the azimuth of about 90 degrees between the sun and solar panels at this time in the morning of the fall equinox. This position of the rotating base and the solar panel base may be referred as the starting point of an operational cycle, which cycle is followed by the mounting assembly in an entire day of the fall equinox. The time of the operational cycle is referred as the hours of daylight in the entire day of fall equinox.

At about 12:10 pm of the fall equinox, the rotating base will have rotated gradually to achieve an angle of 181.9 degrees from the earlier angle of 101.8 degrees, as shown in FIG. 12B. The solar panel base will have tilted downward to an angle of 38.6 degrees from the earlier angle of 75.4 degrees as shown in FIG. 12B. This position of the rotating base and the solar panel base may be referred as the midpoint of the operational cycle for the day of fall equinox. Similarly, the above mentioned positions due to the synchronous movements of the rotating base (181.9 degrees from the North) and the solar panel base (tilting downward to the angle of 38.6 degrees) enable the mounting assembly to maintain the azimuth of about 90 degrees between the sun and the solar panels, facing the sun in the noon of fall equinox. The movement of the each base of assembly may be automated or may be manually directed by the user. In either instance, the movement may occur in increments as small as one-tenth of a degree so as to maintain the desired orientation of the assembly with respect to the various positions of the sun throughout the day.

Further on the day of the fall equinox, at about 5:00 p.m. the rotating base will have gradually rotated to achieve an angle of 258.2 degrees from the earlier angle of 181.9 degrees, as shown in FIG. 12B. The solar panel base will have tilted upward to an angle of 75.2 degrees from the earlier angle of 38.6 degrees, as depicted in FIG. 12B. These positions of the rotating base and of the solar panel base may be referred as the end point of the operational cycle for the day of fall equinox. Similarly, the above mentioned positions due to the synchronous movements of the rotating base (258.2 degrees from the North) and the solar panel base (tilting upward to the angle of 75.2 degrees) enable the mounting assembly to maintain the azimuth of about 90 degrees between the sun and solar panels, facing the sun in the exemplary time of the evening of fall equinox.

Figure 13A:
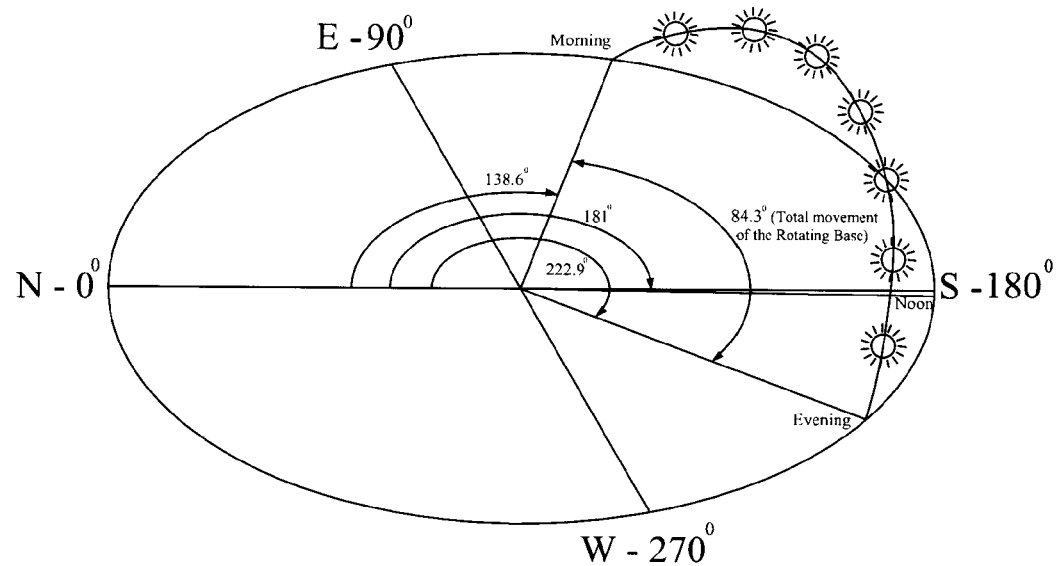
FIGS. 13A and 13B illustrate the angular movement of the mounting assembly with respect to winter solstice in Washington D.C.
Figure 13B:
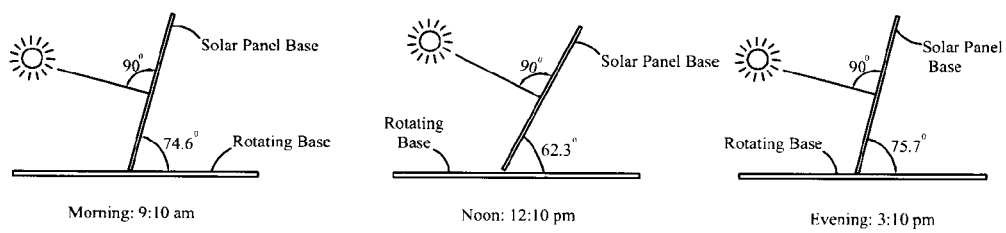

Referring to FIG. 13A and FIG. 13B, illustrated is the angular movement of the mounting assembly with respect to winter solstice in Washington D.C.

Referring to FIG. 13A, illustrated is the angular movement of the rotating base (not shown), in the winter solstice. In this figure at about 9:10 a.m., the rotating base is positioned at an angle of 138.6 degrees from the North. The solar panel base is inclined at an angle of 74.6 degrees to the rotating base, as shown in FIG. 12B. The above mentioned positions of the rotating base (138.6 degrees from the North) and the solar panel base (inclined at an angle 74.6 degrees) enable the mounting assembly to maintain the azimuth of about 90 degrees between the sun and solar panels, in the morning of winter solstice. This position of the rotating base and the solar panel base may be referred as the starting point of an operational cycle, which cycle is followed by the mounting assembly in an entire day of the winter solstice. The time of the operational cycle is referred as the hours of daylight in the entire day of winter solstice. The movement of the each base of assembly may be automated or may be manually directed by the user. In either instance, the movement may occur in increments as small as one-tenth of a degree so as to maintain the desired orientation of the assembly with respect to the various positions of the sun throughout the day.

In the noon at about 12:10 pm, the rotating base will have rotated to an angle of 181 degrees from the earlier angle of 138.6 degrees, as shown in FIG. 12B. The solar panel base will have tilted downward to an angle of 62.3 degrees from the earlier angle of 74.6 degrees, as depicted in FIG. 12B. This position of the rotating base and the solar panel base may be referred as the midpoint of the operational cycle for the day of winter solstice. Similarly, the above mentioned positions due to the synchronous movements of the rotating base (181.9 degrees from the North) and the solar panel base (tilting downward to the angle of 62.3 degrees) enable the mounting assembly to maintain the azimuth of about 90 degrees between the sun and the solar panels, at the particular time of day in the winter solstice.

Further, at about 3:10 pm the rotating base will have rotated to reach an angle of 222.9 degrees from the earlier angle of 181 degrees, as shown in FIG. 12B. The solar panel base will have tilted upward to an angle of 75.7 degrees from the earlier angle of 62.3 degrees, as shown in FIG. 12B. This position of the rotating base and the solar panel base may be referred as the end point of the operational cycle for the day of winter solstice. Similarly, the above mentioned positions due to the synchronous movements of the rotating base (222.9 degrees from the North) and the solar panel base (tilting upward to the angle of 75.7 degrees) enable the mounting assembly to maintain the azimuth of about 90 degrees between the sun and solar panels in the evening of winter solstice.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The embodiments were chosen and described in order to best explain the principles of the present invention and its practical application, to thereby enable others skilled in the art to best utilize the present invention and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present invention.

What is claimed is:

1. A mounting system comprising at least one mounting assembly, each mounting assembly capable of mounting at least one solar panel, the each mounting assembly comprising:

a support base;

a rotating base mounted on the support base, the rotating base configured to rotate about a vertical axis of the rotating base;

a first motor assembly disposed on the support base, the first motor assembly capable of providing a rotational motion to the rotating base;

a solar panel base having an upper surface and a lower surface, the solar panel base pivotally coupled to the rotating base through a set of links at the lower surface, the upper surface is capable of mounting at least one solar panel; and a second motor assembly disposed on the rotating base, the second motor assembly configured to enable the solar panel base to tilt at a plurality of angles to a horizontal surface of the rotating base through at least one link of the set of links;

wherein the set of links are capable of transferring the rotational motion of the rotating base to the solar panel base, and wherein the at least one link of the set of links is capable of tilting the solar panel base at the plurality of angles.

2. The mounting system of claim 1, wherein each of the at least one mounting assembly is arranged in a pre-determined fashion, wherein the pre-determined fashion is selected from the group consisting of a linear arrangement and a staggered arrangement.

3. The mounting assembly of claim 1, wherein the each mounting assembly further comprises a sensor adapted to generate a signal corresponding to speed of the wind and absence of the sun rays, wherein the signal is used to move the solar panel base in a pre-determined position.

4. The mounting system of claim 1, wherein the first motor assembly comprises:

a first motor disposed on the support base; and a first worm gear assembly operably coupled to the first motor, the first worm gear comprising a first worm gear connected to the first motor and adapted to rotate corresponding to the rotation of the first motor, wherein the first worm gear has a spirally threaded part, a first worm wheel operably coupled to the spirally threaded part of the first worm gear, and a first worm shaft attached to the first worm wheel and adapted to couple the first worm wheel to a lower surface of the rotating base.

5. The mounting system of claim 4, wherein the supporting base comprises:

a lower supporting wall disposed on the roof structure or the like;

a set of vertically oriented walls placed on the lower supporting wall; and an upper supporting wall disposed on the set of vertically oriented walls comprising a roller bearing, wherein the roller bearing is rotably fixed in a circular groove in the upper supporting wall, and wherein the upper supporting wall provides a passage to connect the second worm shaft and the rotating base through a hole therein.

6. The mounting system of claim 1, wherein the second motor assembly comprises:

a second motor disposed on the rotating base; and a second worm gear assembly operably coupled to the second motor, the second worm gear assembly comprising a second worm gear connected to the second motor and adapted to rotate corresponding to the rotation of the second motor, wherein the second worm gear has a spirally threaded part, a second worm wheel operably coupled to the spirally threaded part of the second worm gear, and a second worm shaft attached between the second worm wheel and the at least one link of set of links.

7. The mounting system of claim 6, wherein the rotating base further comprises:

a first set of connectors disposed on upper surface of the rotating base and is adapted to pivotably connect the set of links to the rotating base, wherein at least one connector of the first set of connectors connects the second worm shaft to the at least one link.

8. The mounting system of claim 1, wherein the solar panel base further comprises:

a second set of connectors disposed on the lower surface of the solar panel base adapted to pivotably connect the set of links to the solar panel base.

9. A mounting system comprising at least one mounting assembly, each mounting assembly capable of mounting at least one solar panel, the each mounting assembly comprising:

a support base;

a rotating base mounted on the support base, the rotating base configured to rotate about a vertical axis of the rotating base;

a first motor assembly disposed on the support base, the first motor assembly capable of providing a rotational motion to the rotating base;

a solar panel base having an upper surface and a lower surface, the solar panel base pivotally coupled to the rotating base through a set of links at the lower surface, the upper surface is capable of mounting at least one solar panel;

a second motor assembly disposed on the rotating base, the second motor assembly configured to enable the solar panel base to tilt at a plurality of angles to a horizontal surface of the rotating base through a movement of at least one link of the set of links; and a slider mechanism disposed between the rotating base and a peripheral edge of the solar panel base, the sliding mechanism capable of guiding the peripheral edge of the solar panel base for sliding along a horizontal surface of the rotating base based on the movement of the at least one link;

wherein the set of links are capable of transferring the rotational motion of the rotating base to the solar panel base, and wherein the at least one link of the set of links is capable of tilting the solar panel base at the plurality of angles.

10. The mounting system of claim 9, wherein each of the at least one mounting assembly is arranged in a pre-determined fashion, wherein the pre-determined fashion is selected from the group consisting of a linear arrangement and a staggered arrangement.

11. The mounting assembly of claim 9, wherein the each mounting assembly further comprises a sensor adapted to generate a signal corresponding to speed of the wind and absence of the sun rays, wherein the signal is used to move the solar panel base in a pre-determined position.

12. The mounting system of claim 9, wherein the first motor assembly comprises:

a first motor disposed on the support base; and a first worm gear assembly operably coupled to the first motor, the first worm gear assembly comprising a first worm gear connected to the first motor and adapted to rotate corresponding to the rotation of the first motor, wherein the first worm gear has a spirally threaded part, a first worm wheel operably coupled to the spirally threaded part of the first worm gear, and a first worm shaft attached to the first worm wheel and adapted to couple the first worm wheel to a lower surface of the rotating base.

13. The mounting system of claim 12, wherein the supporting base comprises:
a lower supporting wall disposed on the roof structure or the like;
a set of vertically oriented walls placed on the lower supporting wall;
an upper supporting wall in parallel with the lower supporting wall disposed on the set of vertically oriented walls comprising a circular groove, a hole and a roller bearing;
wherein the roller bearing is rotably fixed in the circular groove in the upper supporting wall,
and wherein the circular hole provides a passage to connect the second worm shaft and the rotating base.

14. The mounting system of claim 9, wherein the second motor assembly comprises:
a second motor disposed on the rotating base; and
a second worm gear assembly operably coupled to the second motor, the second worm gear assembly comprising
a second worm gear connected to the second motor and adapted to rotate corresponding to the rotation of the second motor, wherein the second worm gear has a spirally threaded part,
a second worm wheel operably coupled to the spirally threaded part of the second worm gear, and
a second worm shaft attached between the second worm wheel and the at least one link of set of links.

15. The mounting system of claim 14, wherein the rotating base further comprises:
a first set of connectors disposed on upper surface of the rotating base and is adapted to pivotably connect the set of links to the rotating base, wherein at least one connector of the first set of connectors connects the second worm shaft to the at least one link.

16. The mounting system of claim 9, wherein the solar panel base further comprises:
a second set of connectors disposed on the lower surface of the solar panel base adapted to pivotably connect the set of links to the solar panel base.

17. The mounting system of claim 9, wherein the slider mechanism comprises:
a slider comprising
a pair of wheels,
a first connecting rod adapted to pivotably connect centers of the pair of wheels, and
a second connected rod connecting a middle portion of the first connecting rod and the peripheral edge of the solar panel base; and
a slider way disposed on the rotating base adapted to guide the peripheral edge to slide thereon.

18. A mounting system comprising at least one mounting assembly, each mounting assembly capable of mounting at least one solar panel, the each mounting assembly comprising:
a support base;
a rotating base mounted on the support base, the rotating base configured to rotate about a vertical axis of the rotating base;
a first motor assembly disposed on the support base, the first motor assembly capable of providing a rotational motion to the rotating base;
a solar panel base having an upper surface and a lower surface and a set of links attached to the lower surface, the set of links of the solar panel base pivotally coupled to the rotating base, wherein the upper surface is capable of mounting at least one solar panel; and
a second motor assembly disposed on the rotating base and operably coupled to the link, the second motor assembly configured to enable the solar panel base to tilt at a plurality of angles to a horizontal surface of the rotating base through the link;
wherein the set of links are capable of transferring the rotational motion of the rotating base to the solar panel base, and
wherein the set of links are further capable of tilting the solar panel base at the plurality of angles.

19. The mounting system of claim 18, wherein each of the at least one mounting assembly is arranged in a pre-determined fashion, wherein the pre-determined fashion is selected from the group consisting of a linear arrangement and a staggered arrangement.

20. The mounting assembly of claim 18, wherein the each mounting assembly further comprises a sensor adapted to generate a signal corresponding to speed of the wind and absence of the sun rays, wherein the signal is used to move the solar panel base in a pre-determined position.

21. The mounting system of claim 18, wherein the first motor assembly comprises:
a first motor disposed on the support base; and
a first worm gear assembly operably coupled to the first motor, the first worm gear assembly comprising
a first worm gear connected to the first motor and adapted to rotate corresponding to the rotation of the first motor, wherein the first worm gear has a spirally threaded part,
a first worm wheel operably coupled to the spirally threaded part of the first worm gear, and
a first worm shaft attached to the first worm wheel and adapted to couple the first worm wheel to a lower surface of the rotating base.

22. The mounting system of claim 18, wherein the supporting base comprises:
a lower supporting wall disposed on the roof structure or the like;
a set of vertically oriented walls placed on the lower supporting wall;
an upper supporting wall disposed on the set of vertically oriented walls comprising a circular groove, a hole and a roller bearing;
wherein the roller bearing is rotably fixed in the circular groove in the upper supporting wall,
and wherein the hole provides a passage to connect the second worm shaft and the rotating base.

23. The mounting system of claim 22, wherein the second motor assembly comprises:
a second motor disposed on the rotating base; and
a second worm gear assembly operably coupled to the second motor comprising
a second worm gear connected to the second motor and adapted to rotate corresponding to the rotation of the second motor, wherein the second worm gear has a spirally threaded part,
a second worm wheel operably coupled to the spirally threaded part of the second worm gear, and
a second worm shaft attached between the second worm wheel and the set of links of the solar panel.

24. The mounting system of claim 18, wherein the rotating base further comprises a set of connectors adapted to pivotably connect the set of links of the solar panel base to the rotating base.

* * * * *